(12) United States Patent
Saha et al.

(10) Patent No.: US 8,065,490 B2
(45) Date of Patent: Nov. 22, 2011

(54) HARDWARE ACCELERATION OF STRONGLY ATOMIC SOFTWARE TRANSACTIONAL MEMORY

(75) Inventors: Bratin Saha, Santa Clara, CA (US);
Ali-Reza Adl-Tabatabai, Santa Clara, CA (US); Tatiana Shpeisman, Menlo Park, CA (US); Cheng Wang, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 517 days.

(21) Appl. No.: 11/906,175

(22) Filed: Sep. 28, 2007

(65) Prior Publication Data

US 2009/0089520 A1      Apr. 2, 2009

(51) Int. Cl.
*G06F 9/312* (2006.01)
(52) U.S. Cl. .................. 711/152; 711/154; 711/E12.04
(58) Field of Classification Search .................. 711/145, 711/152, 154, E12.04
See application file for complete search history.

(56) References Cited

U.S. PATENT DOCUMENTS

| | | | | |
|---|---|---|---|---|
| 6,535,997 | B1 * | 3/2003 | Janson et al. | 714/15 |
| 7,590,806 | B2 * | 9/2009 | Harris et al. | 711/154 |
| 2005/0149634 | A1 * | 7/2005 | McKenney | 709/248 |
| 2007/0168393 | A1 * | 7/2007 | Howell et al. | 707/200 |
| 2008/0040551 | A1 * | 2/2008 | Gray et al. | 711/130 |
| 2008/0127035 | A1 * | 5/2008 | Lev et al. | 717/100 |
| 2008/0177955 | A1 * | 7/2008 | Su | 711/154 |
| 2008/0256073 | A1 * | 10/2008 | Detlefs et al. | 707/8 |
| 2009/0077329 | A1 * | 3/2009 | Wood et al. | 711/156 |

* cited by examiner

*Primary Examiner* — Pierre-Michel Bataille
*Assistant Examiner* — Hal Schnee
(74) *Attorney, Agent, or Firm* — Trop, Pruner & Hu, P.C.

(57) ABSTRACT

In accordance with some embodiments, software transactional memory may be used for both managed and unmanaged environments. If a cache line is resident in a cache and this is not the first time that the cache line has been read since the last write, then the data may be read directly from the cache line, improving performance. Otherwise, a normal read may be utilized to read the information. Similarly, write performance can be accelerated in some instances to improve performance.

15 Claims, 2 Drawing Sheets

HARDWARE ACCELERATION OF STRONGLY ATOMIC SOFTWARE TRANSACTIONAL MEMORY

BACKGROUND

This relates to computer systems with transactional memory.

Transactional memory (TM) eliminates many of the problems associated with locks and enables developers to compose multi-threaded applications safely. TM constructs (in the form of an atomic block, or transaction) have been added to new or existing languages. TM is a concurrency control mechanism for controlling access to shared memory in concurrent computing. Software transactional memory (STM) is a transactional memory implemented in software.

DETAILED DESCRIPTION

Figure 1:
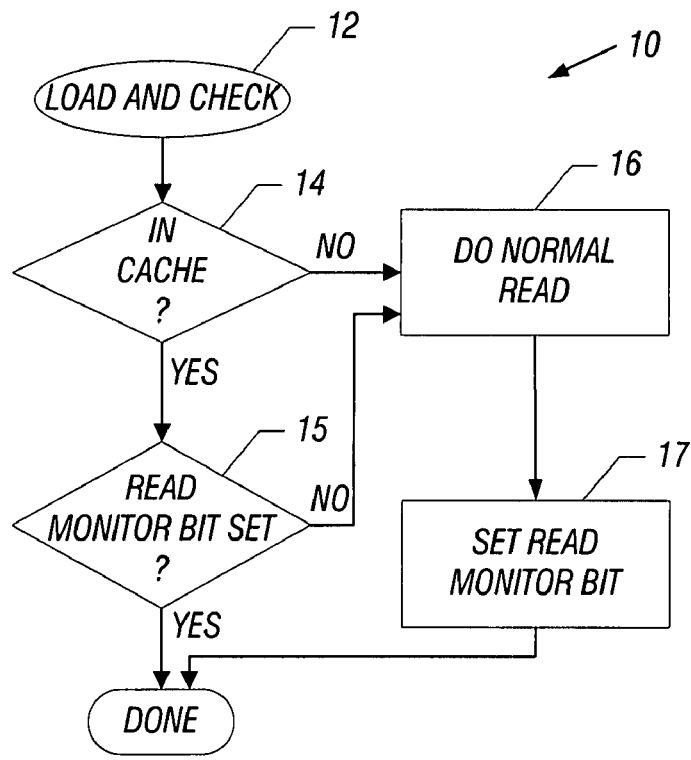
FIG. 1 is a flow chart for a hardware assisted strong atomicity read according to one embodiment.

With transactional memories, the programmer declares an atomic code block. The underlying system guarantees atomicity and isolation during execution, giving the illusion that the block executes in an atomic step with respect to other concurrently executing operations. In software transactional memory systems, a pointer sized transaction record tracks the state of each object accessed inside a transaction.

There are two types of transactional memory implementations. Transactional memory that provides weak atomicity isolates transactions only from other transactions. Software implementation of weak atomicity may insert barriers only into the transactional code. Transactional memory that provides strong atomicity isolates transactions from both transactional and non-transactional code. Software implementation of strong atomicity inserts barriers into both transactional and non-transactional code.

In software transactional memory, for each memory location there is an associated transaction record. Multiple memory locations can map to the same transaction record. For example, software transactional memory for unmanaged languages, like C++, may use cache-line based conflict resolution, where a cache line may be mapped into one transaction record. Software transactional memory for managed languages, like Java, may use object based conflict resolution, where all fields of an object may be mapped into one transaction record.

The transaction record represents the state of data at a memory location. A transaction record can be in the shared state, which allows read only access by any number of transactions, or the exclusive state, which allows read-write access by the single transaction that owns the record. In the shared state, the record contains a version number used for optimistic read concurrency. In the exclusive state, the record contains a pointer to the owning transaction descriptor. The exclusive anonymous state indicates that some thread owns the object exclusively for non-transactional read-write access, but the record does not indicate which thread owns the record.

Enforcing memory ordering and isolation between transactional and non-transactional threads involves read and write isolation barriers in code that executes outside of atomic blocks.

A system that provides strong atomicity ensures isolation, even in the presence of threads that access shared data outside transactions. A strong atomic system also orders transactions with conflicting non-transactional memory operations in a consistent manner.

In a software transactional memory with cache line based conflict resolution, the software transactional memory maintains a table of transaction records. Given an address, the software transactional memory may use a hashing function to find an index of the corresponding transaction record in the table.

In a software transactional memory with object based conflict resolution, the transaction records are allocated in the object headers. In such a system, the software transactional memory computes the address of the transaction record by adding a fixed offset to the object address.

For writes, the software transactional memory may use a two-phase locking and acquire ownership of the transaction record by atomically setting it to the transaction descriptor. In an in-place update scheme, the software transactional memory logs the old value before updating the memory location. In a write buffering scheme, the software transactional memory writes the new value in a commit log and copies values from the commit log into the memory locations when transaction commits. For reads, the software transactional memory may use the transaction record as a version number. Before reading a datum, the software transactional memory logs the version number of that datum and validates at intervals that the version number has remained the same. The software transactional memory may use even numbers for transaction descriptors and odd numbers for version numbers, or some other mechanism that allows it to detect if a transaction record represents transaction descriptor or version number.

The software transactional memory requires that all accesses to shared data be mediated through read and write barriers which enforce the software transactional memory access protocol. In strongly atomic software transactional memory system the code outside the transaction also is instrumented to preserve true isolation and ordering of the transactions.

Thus, in a pure software path code sequence for strong atomicity reads, called a normal read herein, initially a transaction record is read and then a check determines whether any thread owns the memory location to be read. In other words, a determination is made as to whether the record is in the shared state, which can be detected by checking if it represents a version number. If the check fails, then the data cannot be read because another thread has an exclusive access to the data. A contention algorithm is called to resolve the situation of contention for the data. If the check succeeds, then the read can be done. Next, a comparison ensues that the version numbers did not change. If the comparison fails, then a contention algorithm is called and the result of the previous read is not used.

In a software code sequence for strong atomicity writes, called a normal write herein, the transaction record is locked, a write is implemented, and then the lock is released. To perform a non-transaction write, the transaction record must be set to an anonymous exclusive state. Initially, there is an attempt to atomically change the value of a transaction record to indicate this state. This may be referred to as establishing a lock.

If this cannot be done (e.g., because the transaction is not in a shared state), then there is a contention and a contention algorithm is called, because another entity is also writing to the same memory location. If the lock succeeds, then the data may be written. The last thing that is done is to release the lock and set the transaction record to the shared state with an incremented version number.

With a hardware assisted software transactional memory, both the read and the write barriers can be made faster. The hardware allows the transactional memory to detect if the memory location was not changed since the last read or write. In this case the data can be read without performing additional checks or written without acquiring the lock on the transaction record.

The hardware provides two special bits per transaction record associated with the data residing in the processor cache—a read monitor bit and a write monitor bit. It uses these bits to track if the data is written by another processor. In this case the hardware resets the read monitor bit and the write monitor bit. A transactional memory system with cache line based conflict detection may use one read monitor bit and one write monitor bit per cache line (because there is one transaction record per cache line). Transactional memory system with object based conflict detection may use multiple read and write monitor bits per cache line. The number of bits depends on how many objects can be located in the same cache line and should be sufficient to have one read monitor bit and one write monitor bit per object.

In the case of the read, as shown in FIG. 1, a load and check instruction at block 12 reads the data. The load and check instruction loads the data from memory and sets a flag if the data is in the cache and a corresponding read monitor bit is set. In one embodiment, a carry flag is set. If the data is in the cache (diamond 14) and the read monitor bit is set (diamond 15), then the faster read is done. Otherwise, the normal read, described above, is implemented, as indicated at block 16. Then, the read monitor flag is set in block 17.

As an example, in some embodiments, a cache line may be mapped to the transactional record. Initially, the read monitor bit may be zero in one embodiment. In a cache line example, the read monitor bit may be associated with a cache line. The read monitor bit may be set to one after the first time that a normal read is completed. The load and check operation then determines if the data is both in the cache and the read monitor bit is set to one, indicating that one normal read has already been completed and no other thread has changed the data.

The first time the cache line is accessed, the read monitor bit is zero. The load and check operation fails and a normal read is done at block 16. After the completion of the normal read, the read monitor bit is set to one, as indicated at block 17.

The second time the cache line is read, if no thread has written the data in the interim, the read monitor bit is set and the data is in the cache so the load and check succeeds and the faster read operation is done, without having to complete all the steps of a normal read.

The benefit of the monitor bit is that it enables one to avoid using the normal read when unnecessary, thereby improving performance. In one embodiment, the fast path for the normal read requires six instructions while the fast path for the hardware assisted read requires only two instructions—a load and check followed by a conditional jump.

For the store, the hardware assisted software transactional memory store and check code 18 checks, at oval 18, that the data is in the cache and the corresponding write monitor bit is set. If these conditions are met, the store is done and a flag is set to one. In one embodiment, a carry flag may be set. If the data is not in the cache or the monitor bit is not set, the store is not performed and the flag is reset to zero. The checks and the store are performed atomically, that is, no write from another processor can occur between the checks and the write. If the data is in the cache, as determined at diamond 20, and the write monitor bit is set (diamond 25) then the faster write is done. If not, then a normal software assisted store (described above) can be done, as indicated in block 22. A write monitor bit is then set to one at block 23.

In one embodiment, the fast path for the normal write uses four instructions while the fast path for the hardware assisted read uses only two instructions—a store and check followed by a conditional jump. Thus, the cost of a strong atomicity write can come down from four to two instructions without executing a lock instruction in the fast path.

An implementation of software transactional memory can be classified into two kinds depending on how it performs transactional writes. An in-place update software transactional memory updates a value in memory immediately. If a thread writes X to 1, then X immediately becomes 1 and all threads that can read X see that change. In contrast, in a write buffering software transactional memory, the write goes to a buffer first and is only copied to a memory location when the transaction completes successfully.

Figure 2:
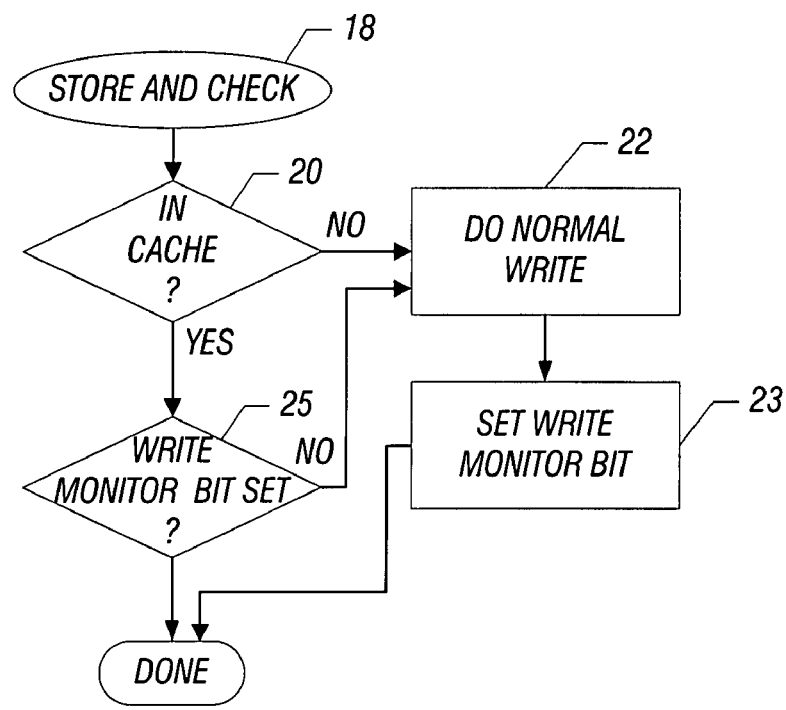
FIG. 2 is a flow chart for a hardware assisted strong atomicity write according to one embodiment.

The read and write routines, shown in FIGS. 1 and 2, work for an in place update software transactional memory with no modifications required on transactional code.

Figure 3:
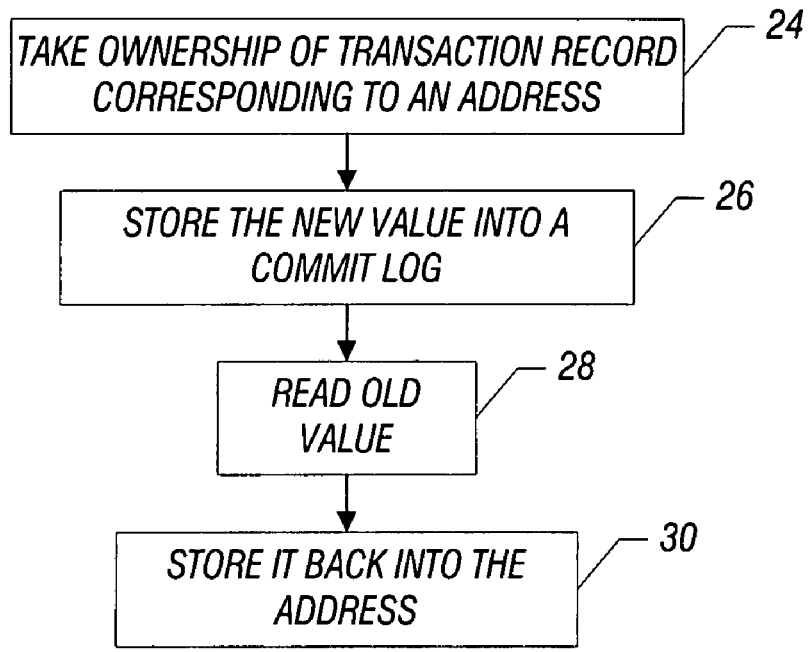
FIG. 3 is a flow chart for a hardware assisted transactional write in a transactional memory system with write buffering according to one embodiment.

The hardware assisted strongly atomic software transactional memory also works for a write buffering scheme. As shown in FIG. 3, a transactional write takes ownership of the transaction record corresponding to an address of the written memory location, as indicated in block 24. The new value is stored into a commit log, as indicated in block 26. The old value is read and stored back into the memory location, as indicated in blocks 28 and 30. By storing the old value back into the memory location, the transaction is forced to take exclusive ownership of the cache line. This results in resetting of the corresponding read monitor bit and write monitor bit allowing cache reuse to be leveraged in non-transactional threads.

This algorithm works with encounter time locking. Some write buffering algorithms use commit order locking. In such cases, the transaction has to read the old value and write it back into the memory location atomically. This guarantees that no other thread could change that value in between of the read and the write.

The problem that arises with the algorithm set forth in FIGS. 1 and 2, in the case of write buffering, may be understood from an example. Assume that X is read non-transactionally the first time using the algorithm of FIG. 1. Then a transaction executed by another thread writes X. If the write is an in-place update, the read monitor bit is set to zero and the next time there is a read to that memory location, the load and check (FIG. 1) fails. However, if write buffering was used to write the data, the write goes to a buffer, without resetting the monitor bit, so the load and check would not fail when, in fact, it should.

By writing the old value at the pertinent memory location back to the same memory location, the read monitor bit is set to the proper state without changing anything at the memory location. At the memory location, the old data is simply rewritten to the same location, the new data remains in the write buffer, and all that has been achieved is to set the read monitor bit to the correct state.

While examples were given above with respect to unmanaged environments using software languages such as C++, the algorithms set forth above also operate in managed environments, such as Java environments, as well. In the managed environments, more read and write monitor bits may be used per cache line. In the managed environment, the algorithms still work in the same way and there need be no changes in the algorithms already described in connection with the unmanaged environments.

Figure 4:
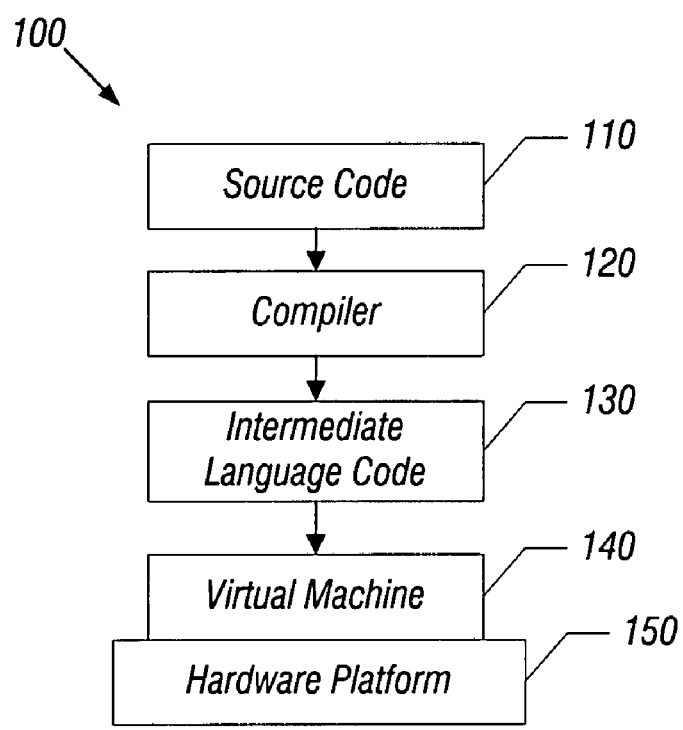
FIG. 4 is an architectural depiction of one embodiment.

A software program compilation and execution system 100 includes a compiler 120 that compiles source code 110 into an intermediate language code 130, as shown in FIG. 4. The source code 110 may be, for example, Java. The intermediate language code 130 may be, for example, Java byte-code or Common Intermediate Language code. The compiler 120 may be a software system that is run on a computer system and the intermediate language code 130 is stored in a memory of the computer system, a hard drive, or downloaded from an external source.

The software program compilation and execution system 100 includes a virtual machine 140 and a hardware platform 150. The virtual machine 140 further compiles the intermediate language code 130 into native code. The virtual machine 140 may be implemented as a software system. In this embodiment, the virtual machine 140 runs on the hardware platform 150. The virtual machine 140 may be, for example, a Java virtual machine, a small talk runtime system, or other runtime system. Alternatively, the virtual machine 140 may be implemented using other techniques (e.g., as a firmware system).

The hardware platform 150 executes the native code compiled by the virtual machine 140. The hardware platform 150 may be implemented, for example, by a personal computer, a personal digital assistant, a network computer, a server computer, a notebook computer, a workstation, a mainframe computer, or a supercomputer.

With commit order, locking transaction attempts to atomically execute boxes 28 and 30 in FIG. 3. This operation succeeds if the old value has not changed between the read and the store.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A computer readable non-transitory medium storing instructions that enable a computer using a software transactional memory to:
   write a new value to be written to a memory location to a commit log;
   read a value stored at that memory location and store the read value back to said location to automatically reset a monitor bit that is reset when a write to a memory location occurs; and
   copy the new value into the memory location when a write transaction completes successfully.

2. The medium of claim 1 further storing instructions to:
   determine if a location has been written by a second thread since a read or write by a first thread to the location; and
   if not, data is read or written at the location using less instructions than are used if data had been written by a second thread since a read or write to the location by said first thread.

3. The medium of claim 2 further instructions to use a bit to indicate whether data has been written since a read or write by the first thread to the location.

4. The medium of claim 3 further storing instructions to reset the bit after data has been written to the location since a read or write to that location.

5. The medium of claim 4 further storing instructions to determine if data has been written to the location since the location was read and, if so, to read the data directly.

6. The medium of claim 5 further storing instructions to reset the read monitor bit each time a write to the data occurs.

7. The medium of claim 4 further storing instructions to determine if the data has been written by the second thread since a write to the location by the first thread and, if so, to write the data directly by the first thread.

8. A system comprising:
   a memory device to store compiler code and program code;
   a processor coupled to said memory device to execute compiler code, for a software transactional memory to write a new value to he written to a memory location to a commit log, read a value stored at said memory location and store the read value back to said location to automatically reset a monitor bit and copy the new value into said memory location when a write transaction completes successfully.

9. The system of claim 8 wherein said processor to determine if write buffering is used and, if so, to rewrite the data back to the location and to set a monitor bit to its proper state.

10. The system of claim 9, said processor to use a bit to indicate whether data has been read since the write to the location.

11. The system of claim 10, said processor to reset the bit after the data has been read since the write to the location.

12. The system of claim 11, said processor to determine if the data has been read since the write to the location and, if so, to read the data directly.

13. The system of claim 12, said processor to reset the read monitor bit each time a write to the location occurs.

14. The system of claim 9, said processor to set a bit to indicate whether data has been written to the location.

15. The system of claim 14, said processor to implement write buffering by taking ownership of a transaction record corresponding to an address, storing a new value into a commit log, and reading an old value and storing it back into the address.

* * * * *